Oct. 18, 1932.     W. D. SCHMIDT     1,882,975
CHUCK
Filed Dec. 10, 1929
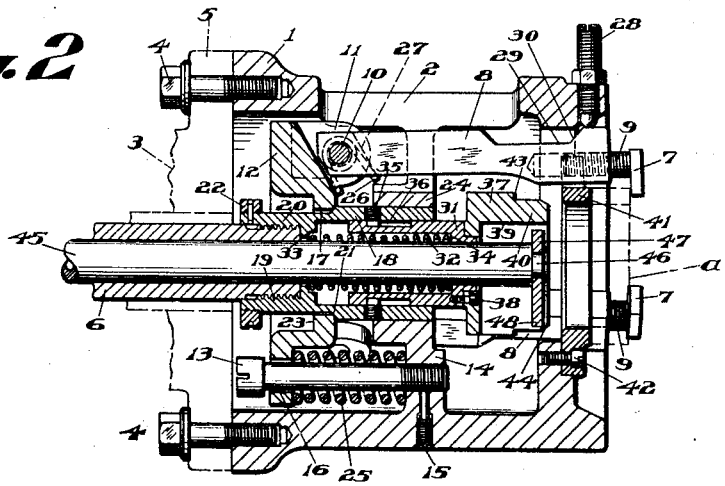
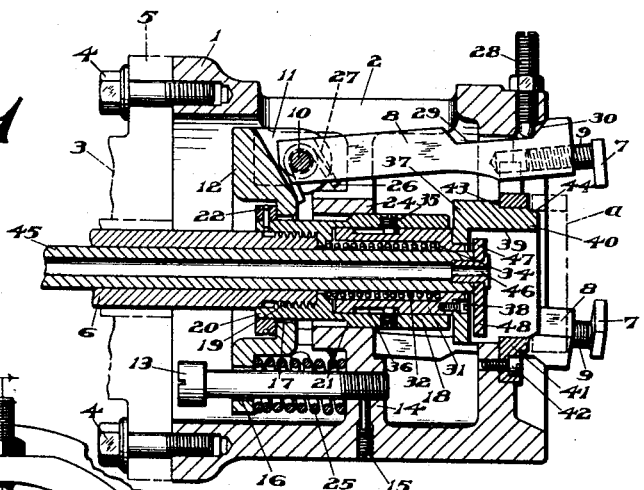
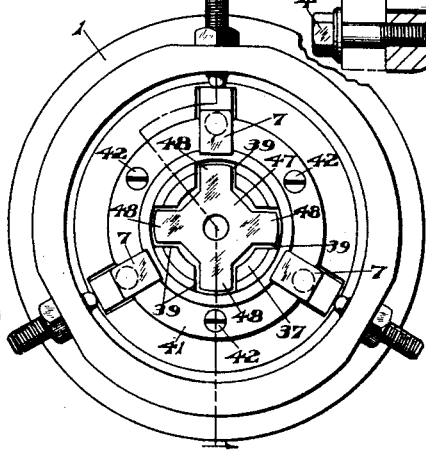
Inventor
William D. Schmidt
By Geo. H. Kennedy Jr.
Attorney Patented Oct. 18, 1932

1,882,975

UNITED STATES PATENT OFFICE

WILLIAM D. SCHMIDT, OF WORCESTER, MASSACHUSETTS, ASSIGNOR TO THE HEALD MACHINE COMPANY, OF WORCESTER, MASSACHUSETTS, A CORPORATION OF MASSACHUSETTS

CHUCK

Application filed December 10, 1929. Serial No. 413,099.

The present invention relates to workholding devices or chucks, especially those adapted to hold annular or hollow workpieces in position to be operated upon interiorly by a tool, grinding wheel or the like.

The invention of J. G. McDonough, as set forth in U. S. Reissue Letters Patent No. 16,141, has largely revolutionized internal grinding. Prior to McDonough's invention, it was necessary in interal grinding for the operator to stop the machine, cause the carriage to separate the grinding wheel and workpiece a substantial distance, and gauge the hole in the workpiece with a plug. This manual gauging operation usually had to be performed several times in the grinding of each workpiece hole to the desired size within the necessary tolerances. This manual gauging resulted in a large expenditure of time and skilled labor which necessarily increased the cost of the completed workpiece materially.

According to the McDonough invention an internal gauge is mounted for rotation with the workpiece, and is periodically urged against it. This gauge and the grinding wheel support are located at opposite ends of the workpiece in order that the gauge may be urged against one end of the workpiece while the grinding wheel is in operation adjacent the opposite end, thereby avoiding the necessary separation of the workpiece and grinding wheel during the gauging operation, as in prior constructions, and since the gauge turns with the workpiece the work is gauged while the machine is operating. This results in a great saving of time, and lower production cost, and since the gauging is made automatic in this construction the cost of each workpiece is further materially decreased.

In the copending application Serial No. 308,390, filed by Richard H. Jellico on September 26, 1928, now Patent No. 1,823,902, granted September 22, 1931, there is illustrated and described a plug workpiece centering device for a chuck, which is adapted to accurately center workpieces that have already been turned or rough ground to true circles. That application is a divisional application from an original, Serial No.157,144, filed December 27, 1926, now Patent No. 1,812,006, granted June 30, 1931, the last named disclosing not only the plug centering device but also a three finger internal centering device. These constructions, however, disclose no way by which an automatic gauge can be mounted in a chuck in connection with workpiece centering plug in order that the internal opening in the workpiece may be gauged during the grinding operation thereon.

A further development is shown in Patent No. 1,692,379, granted to Kempton, et al., November 20, 1928. In this construction the plug gauge is mounted in a manner similar to the above-mentioned McDonough machine, the work being clamped in a shuttle by reciprocating centering and clamping jaws which engage the outer periphery of the workpiece. The shuttle is then centered in the chuck by a ring member which engages an external portion of the shuttle. This construction is satisfactory in opration although it necessitates the use of an additional member such as the shuttle. It will be apparent that variations in the outer periphery of a workpiece in such a construction will result in a workpiece being located in the chuck out of line with the axis of the chuck in such a manner that the workpiece may be ground inaccurately. It is necessary that the center line of the gauge coincide with the axis of the opening in the workpiece in order for the gauge to operate accurately; since this is not always true in the Kempton, et al. machine, a completed workpiece of this construction may not always be within the required tolerances.

Because of increased precision required in the grinding of hollow workpieces, it is very desirable to center them accurately in the chuck. But chucks constructed in accordance with the above identified applications, without improvement, could not be used in machines of the McDonough type, because the plug or three finger centering device would absolutely block the space required for the automatic gauge or gauges. The present invention contemplates the improvement of the chucks of the type disclosed in the above identified Jellicoe application to permit their use in automatic plug gauging grinding machines, and also the improvement of chucks of the McDonough or Kempton type to permit the use of a plug or internal centering devices in connection therewith. The invention therefore involves the combination in a chuck of an internal gauge and an internal centering device. It will be readily apparent that the accuracy of plug gauging according to the McDonough principle is greatly increased by the use of a chuck having an accurate internal centering device associated therewith, because only by accurate alinement of the axis of the workpiece and the gauge can the gauge operate with its highest efficiency. This is especially true where the workpiece presents sharp corners. No matter how accurately the gauge may be centered, it will be out of line with the axis of the workpiece if the workpiece is not properly centered.

The above and other advantageous features of the invention will hereinafter more fully appear, reference being had to the accompanying drawing, in which, Fig. 1 is a sectional axial view of the chuck or workholding device in open position.

Fig. 2 is a view similar to Fig. 1, showing the chuck in closed position and the gauge moving forwardly toward the workpiece.

Fig. 3 is a front elevation of the chuck.

Like reference characters refer to like parts in the different figures.

Referring to the drawing, the clamping means, the centering means and the gauging means of the chuck, together with their operating devices, all hereinafter described, are preferably inclosed in a substantially cylindrical shell or casing 1 which, however, provides longitudinal slots 2 therein. Said shell 1 may be fastened in any suitable manner to the usual work rotating spindle or shaft 3, a fragment of which is herein shown in broken lines. As illustrated, bolts 4 are provided to attach said shell to a flange 5 formed integrally with said spindle. The spindle or shaft 3 is hollow and contains therein a rod 6 which is adapted when moved to the right to open the chuck, and when moved to the left to close it. The construction, arrangement and operation of the parts controlled by said rod will now be set forth in detail.

The work clamping means of the chuck is preferably adapted to hold the workpiece $a$ by engagement with the radial faces thereof, in order that the clamping pressure may not deform said workpiece. As shown in all the figures, a series of adjustable clamping jaws 7 are mounted in the ends of fingers 8, the jaws providing screw threaded shanks 9 which fit in interiorly threaded bores in the ends of said fingers. Each finger 8 is pivotally mounted upon a pin 10 which extends between ears 11 provided by a member 12.

The member 12 is slidably mounted in the chuck in the following manner. As shown in Figs. 1 and 2, a series of bolts 13 are screwed into a web or flange 14 which extends radially inward from the cylindrical shell 1. Any suitable device such as a pin and set screw 15 may be used to lock the bolts in position once the proper adjustment has been found. The member 12 provides a series of holes 16, preferably intermediate the several pairs of ears 11, by means of which said member is mounted on the said bolts 13. The member 12 also provides a comparatively large central axial hole 17 by means of which it is mounted upon a hollow cylindrical member 18.

The hollow cylindrical member 18 is in screw threaded engagement at 19 with the rod 6, and mechanically considered is integral with said rod. The portion 20 of the member 18 which supports the member 12 is a reduced portion, leaving a shoulder 21 at the forward end which is adapted to engage, in one position of the parts, with the front of the member 12, while the rear end of the reduced portion 20 is bounded by a ring or nut 22 which is screwed onto the end of member 18, thus providing a stop for engagement with a portion 23 of the member 12.

The full diameter portion of the member 18 is in slidable engagement with the interior of a ring or annulus 24 formed integrally with the flange 14, and thus the member 18 and therefore the front of the rod 6 are slidably supported in the chuck.

Springs 25 surround the bolts 13, and urge the member 12 rearwardly in the chuck. When the rod 6 is pushed forwardly of the chuck, the nut or ring 22 contacts with the shoulder 23 provided by the member 12, and forces said member forwardly, thus moving the jaws 7 away from the radial front face of the workpiece $a$. In this position of parts the fingers 9 are spread apart, by reason of the fact that springs 26 are located around the pins 10, the ends of the springs bearing against the member 12 and against an interior portion 27 formed by making a slot in the ends of the fingers, adjustable round nose screws 28 engaging recesses 29 formed in the fingers 8, and thus permitting the fingers to distend as shown in Fig. 1.

Movement rearwardly of the draw bar 6 releases the member 12 and the springs 25 then come into action to move said member, thus drawing the jaws 7 towards a workpiece $a$. The jaws 7 are at that time forced together by engagement of an inclined or cam surface 30 on the fingers 8 with the screws 28. Before describing exactly the sequence of movement of the parts in the clamping action of the chuck, the work centering plug and the gauge will be described.

As shown in Figs. 1 and 2, the front end of the member 18 is hollow, and it slidably supports a member 31 which is also hollow, and receives therein a spring 32. The rear end of the spring 32 abuts against an inner extending portion 33 of the member 18, or it may abut directly against the draw rod 6, while the front end of said spring 32 abuts a shoulder 34 provided by the hollow member 31. At all events the spring serves to move the member 31 forwardly with respect to the draw bar 6 and member 18 carried thereby, and any suitable device for setting limits to the relative motion may be employed, such as one or more screws 35 extending through the member 18 having their points in slots 36 provided by the member 31.

The member 31 is adapted to hold plug centering devices 37 of various sizes, and to that end said work centering devices are detachable, and fastened to the member as by screws 38. Each plug centering device is hollow, and the cylindrical wall thereof is cut by a plurality of radial and longitudinal slots 39.

The external surface of the plug 37 provides a cylindrical portion 40 which fits within a detachable ring or backing plate 41 that is fastened to the chuck by means of screws 42, said ring holding the reacting force of the jaws 7 and thus assisting in clamping the workpiece in position. A shoulder 43 is provided on the member 37 in order that the plug may not move farther forward than the position shown in Fig. 1. The front edge of the plug 37 is beveled as shown at 44 to provide a centering surface which engages with the inner surface of an annular or hollow workpiece in order accurately to center said workpiece. The plug is accordingly arranged to engage and center the workpiece in relation to the surface which is to be gauged.

The spindle 6 is hollow, and inside it is a gauge rod 45 which is also hollow in order that coolant may be conveyed to the workpiece. On the front of the gauge rod 45 are one or more gauges, held in place by a hollow screw 46, this illustrative embodiment of the invention showing but a single gauge 47. The gauge 47 is in this instance made in the form of a cross with the projecting portions or gauge points 48 fitting within the slots 39, and the gauge body fitting inside the hollow plug 37.

It will now be seen that the gauge can move inside the chuck, without in any way interfering with the plug 37 or any of the chuck mechanism, and in fact the gauge and the plug can engage the workpiece simultaneously on the same inner surface thereof, the gauge occupying part of the internal periphery of the workpiece and the plug the remainder thereof. The number of slots 39 and the number of gauge points 48 on the gauge 47 could be varied, that shown being merely illustrative.

The chuck of the invention is operated as follows. With the parts in the position shown in Fig. 1, that is to say, with the draw rod 6 to the right, and with the jaws 7 spread apart and spaced in front of the chuck backing plate 41 the workpiece $a$ may be placed in position by the operator, the rear internal edge of the workpiece contacting the surface 44 of the centering plug 37. Holding the workpiece in this position with one hand, the operator grasps the chuck operating lever, not shown, which is adapted to move the draw rod 6 to the left. As the operator in this manner moves the draw rod to the left, the ring 22 moves away from the abutment 23 provided by the member 12, and as nothing is now holding said member, it moves to the left under the influence of the springs 25. This motion of the member 12, which thus follows up the draw rod 6, is accompanied by a closing in the jaws 7 upon the workpiece, both axially and radially; the former because of the connection of these jaws to the fingers 8 which are attached to the member 12, and the latter because of the cam surfaces 30 and the cooperating screws 28.

Ultimately the inner faces of the jaws 7 contact the workpiece $a$, and urge it towards the backing plate or ring 41. It will now be seen that leftward movement of the draw bar 6, carrying with it the member 18, does not move the centering plug 37 immediately, because of the provision of the lost motion connection embodied in the screws 35 and slots 36. The jaws 7 should be set to contact the workpiece just before the screws 35 come to the left hand end of said slots 36, at which time the plug centering device is held resiliently against the ring 41 by means of the spring 32. The combined force of all the springs 25 is, however, greater than the force of the spring 32, and consequently the workpiece is firmly clamped against the back plate 43, but as it is so clamped, it automatically centers itself in pushing the centering plug 37 inwardly of the chuck, on account of the conical surface 44.

The workpiece is now held in position, but in an apparatus of this class it is necessary to cause the centering plug to be withdrawn well out of the range of travel of a grinding wheel or other tool which will cut the interior surface of the workpiece, so as to prevent interference between said tool and said plug. Therefore the actuation of the draw rod 6 does not stop when the jaws 7 are not in the position to engage a workpiece but said draw rod continues to move to the left, and as the screws 35 will, very shortly after the commencement of said movement, contact the left hand ends of the slots 36, further movement of the draw bar 6 will draw the plug inwardly of the chuck into the position shown in Fig. 2.

This further movement of the chuck draw bar to carry the centering plug into the chuck and out of the way of the grinding or other tool, is also made use of for exerting a clamping pressure greater than that exerted by the springs 25. That is to say, the draw bar 6 is adapted to be urged to the left by some powerful resilient means, not shown, which ultimately brings the shoulder 21 against the member 12, and forces the clamping jaws very firmly against the workpiece. It is within the contemplation of the present invention, however, that the springs 25 might be used alone to hold the workpiece in position.

With the parts in the position shown in Fig. 2, and with the centering plug 37 well in the chuck, it is apparent that a grinding operation may be performed on the workpiece. The gauge 47 inside said centering plug 37 may now be intermittently urged against the workpiece *a* in a manner described in the aforesaid McDonough patent, or in any other way. At all events it is apparent that the gauge can operate without interference by the work centering plug, nor does the gauge itself interfere with the plug when the plug is in work centering position. The gauge rod 45, as already set forth, is inside the draw bar 6, and coolant may be introduced through the gauge rod and through the hollow screw 46 to the workpiece being ground.

I claim:

1. In a chuck, an internal centering device arranged to engage a workpiece on the surface to be gauged, and an internal gauge mounted inside said centering device.

2. In a chuck, an internal centering device for engaging the inner surface of a workpiece, an internal gauge, a gauge rod upon which said gauge is mounted, and a support for the gauge rod provided by the internal centering device.

3. In a chuck, centering means adapted to engage a workpiece on the surface to be gauged, gauging means, and supporting means provided by said centering means for said gauging means.

4. In a chuck, a centering plug adapted to contact a cylindrical interior of a workpiece, as the work is being drawn to clamping position, and a gauge adapted to contact the same interior of said workpiece to measure its size, the contacting parts of plug and gauge alternating around a circle.

5. In a chuck, a centering device adapted to engage the inner surface of a workpiece, a gauge for said surface, and means to draw said centering device inwardly of the chuck after the centering operation without interference with said gauge.

6. In a chuck, work clamping members, work centering means against which a workpiece is adapted to be urged by said work clamping members, a backing plate to take the force of the clamping members, resilient means urging the centering means forward, means to urge the clamping means to clamp a workpiece with a force great enough to overcome said resilient means, means to thereafter withdraw the centering means, and further means for thereafter increasing the pressure on the workpiece.

7. In a chuck, a hollow work centering plug, a gauge inside said plug, the gauge having projecting portions, and the centering plug being slotted to accommodate the said projections whereby the plug and gauge may each engage the same surface of a workpiece.

8. In a chuck, the combination with a gauge and a gauge rod carrying said gauge, the gauge being adapted to be given a relatively large movement in an axial direction to gauge the workpiece, of a centering plug arranged to engage the workpiece on the surface to be gauged and adapted to receive said gauge without interfering with said movement.

9. In a chuck, an internal gauge, and an internal centering device, said gauge and centering device each being arranged to engage the same surface of a workpiece, said device supporting said gauge in position to engage said surface.

WILLIAM D. SCHMIDT.